US012020154B2

(12) United States Patent
Yang et al.

(10) Patent No.: US 12,020,154 B2
(45) Date of Patent: Jun. 25, 2024

(54) DATA PROCESSING METHOD, ELECTRONIC DEVICE AND COMPUTER-READABLE MEDIUM

(71) Applicant: BEIJING XINTANG SICHUANG EDUCATION TECHNOLOGY CO., LTD, Beijing (CN)

(72) Inventors: Song Yang, Beijing (CN); Jian Huang, Beijing (CN); Fei Yang, Beijing (CN); Zitao Liu, Beijing (CN); Yan Huang, Beijing (CN)

(73) Assignee: BEIJING XINTANG SICHUANG EDUCATION TECHNOLOGY CO., LTD, Beijing (CN)

( * ) Notice: Subject to any disclaimer, the term of this patent is extended or adjusted under 35 U.S.C. 154(b) by 35 days.

(21) Appl. No.: 17/605,404

(22) PCT Filed: Apr. 23, 2020

(86) PCT No.: PCT/CN2020/086362
§ 371 (c)(1),
(2) Date: Apr. 28, 2022

(87) PCT Pub. No.: WO2020/216285
PCT Pub. Date: Oct. 29, 2020

(65) Prior Publication Data
US 2022/0358362 A1   Nov. 10, 2022

(30) Foreign Application Priority Data
Apr. 23, 2019   (CN) .......................... 201910329950.1

(51) Int. Cl.
*G06N 3/08* (2023.01)
*G06V 10/30* (2022.01)

(52) U.S. Cl.
CPC ............... *G06N 3/08* (2013.01); *G06V 10/30* (2022.01)

(58) Field of Classification Search
CPC ...................................................... G06N 3/08
See application file for complete search history.

(56) References Cited

U.S. PATENT DOCUMENTS

| 10,360,905 B1* | 7/2019 | Pereira ............. G06V 30/18086 |
| 2018/0005070 A1* | 1/2018 | Lin ........................ G06N 3/084 |
| 2020/0280384 A1* | 9/2020 | Kilambi ................. H04B 1/707 |

FOREIGN PATENT DOCUMENTS

| CN | 105893612 A | 8/2016 |
| CN | 107103364 A | 8/2017 |

(Continued)

OTHER PUBLICATIONS

Xu et al ("Multi-Objective Learning and Mask-Based Post-Processing for Deep Neural Network Based Speech Enhancement", arXiv:1703.07172, Mar. 21, 2017) (Year: 2017).*

(Continued)

*Primary Examiner* — Michael J Huntley
*Assistant Examiner* — Imad Kassim
(74) *Attorney, Agent, or Firm* — Faegre Drinker Biddle & Reath LLP

(57) ABSTRACT

Disclosed are a data processing method, a device and a medium. The method includes: acquiring first feature data and a source identification of data to be processed; determining a first unshared hidden unit, corresponding to the source identification, in an autoencoder, wherein the autoencoder includes a plurality of first unshared hidden units that do not share a parameter with each other; inputting the first feature data into the determined first unshared hidden unit, to perform noise cancellation, and outputting second feature data meeting a set standard; inputting the second feature data into a first shared hidden unit of the autoencoder (Continued)

to map the second feature data to a set feature space through the first shared hidden unit, and outputting mapping data; and inputting the mapping data into a shared feature layer of the autoencoder, and outputting common feature data in the first feature data, extracted by the shared feature layer.

19 Claims, 6 Drawing Sheets

(56) References Cited

FOREIGN PATENT DOCUMENTS

| CN | 107977456 A | 5/2018 |
|---|---|---|
| CN | 109388662 A | 2/2019 |

OTHER PUBLICATIONS

Lu et al. ("Speech Enhancement Based on Deep Denoising Autoencoder", INTERSPEECH Aug. 25-29, 2013) (Year: 2013).*

Wang et al. ("Radar Emitter Recognition Based on the Energy Cumulant of Short Time Fourier Transform and Reinforced Deep Belief Network", MDPI, Sensors, Sep. 14, 2018) (Year: 2018).*

Vukotic et al ("Bidirectional Joint Representation Learning with Symmetrical Deep Neural Networks for Multimodal and Crossmodal Applications", ICMR'16, Jun. 6-9, 2016) (Year: 2016).*

Li et al. ("Deep Heterogeneous Autoencoders for Collaborative Filtering", 2018 IEEE) (Year: 2018).*

Luo et al. ("Detection of Double Compressed AMR Audio Using Stacked Autoencoder", IEEE vol. 12, No. 2, Feb. 2017) (Year: 2017).*

Nugraha et al. ("Multichannel Audio Source Separation With Deep Neural Networks", vol. 24, No. 9, Sep. 2016 IEEE) (Year: 2016).*

Velecela et al ("Sound Source Identification by Neural Networks", INES • Jun. 30-Jul. 2, 2016, pp. 183-188) (Year: 2016).*

Lai et. al, ("A Deep Denoising Autoencoder Approach to Improving the Intelligibility of Vocoded Speech in Cochlear Implant Simulation," in IEEE Transactions on Biomedical Engineering, vol. 64, No. 7, pp. 1568-1578, Jul. 2017) (Year: 2017).*

International Patent Application No. PCT/CN2020/086362 Search Report with English translation, dated Jul. 24, 2020, 6 pages.

Chinese Patent Application No. 201910329950.1, Office Action dated Jan. 14, 2022, 9 pages.

* cited by examiner

DATA PROCESSING METHOD, ELECTRONIC DEVICE AND COMPUTER-READABLE MEDIUM

The present application claims the priority to a Chinese Patent Application No. 201910329950.1, filed with the China National Intellectual Property Administration on Apr. 23, 2019 and entitled "data processing method, electronic device and computer-readable medium", which is incorporated into the present application by reference in its entirety.

TECHNICAL FIELD

The present disclosure relates to the field of computer technology, and in particular to a data processing method, an electronic device and a computer-readable medium.

BACKGROUND

With the development and progress of science and technology, machine learning has attracted more and more attention from people, and the development of the machine learning is more and more rapid. In the process of the machine learning, the quality of training samples is a crucial factor affecting the performance of a machine learning model.

In some scenarios, data as training samples may be difference-source data with a same type but from different sources. The difference-source data refer to different noise data contained therein due to different acquisition devices and/or acquisition environments, which will lead to that a trained machine learning model is affected by different noise data, resulting in the degradation of its performance. Taking voice data as an example, when recording the voice data, there will be some differences in recorded voice data due to different recording devices such as hardware facilities, that is, difference-source voice data, and the recorded voice data will also be disturbed by different environments and noises. This kind of difference-source data will disturb the machine learning model extracting certain common features, and then affect the training of the machine learning model, resulting in the degradation of the performance.

For this problem, the traditional processing method is to collect as much difference-source data as possible to train the machine learning model, make training samples cover more sources, increase the data amount of training and improve the robustness of the machine learning model. However, this processing method will inevitably lead to the degradation of overall performance, and collecting a large number of training samples causes very high cost, and will also increase the collection difficulty.

SUMMARY

The present disclosure is intended to propose a data processing method, an electronic device and a computer-readable medium, to solve a part of or all of the above problems.

In a first aspect, an embodiment of the present disclosure provides a data processing method. The method includes: acquiring first feature data and a source identification of data to be processed; determining a first unshared hidden unit, corresponding to the source identification, in an autoencoder, wherein the autoencoder includes a plurality of first unshared hidden units that do not share a parameter with each other; inputting the first feature data into the determined first unshared hidden unit, to perform noise cancellation, and outputting second feature data meeting a set standard; inputting the second feature data into a first shared hidden unit of the autoencoder, to map the second feature data to a set feature space through the first shared hidden unit, and outputting mapping data; and inputting the mapping data into a shared feature layer of the autoencoder, and outputting common feature data in the first feature data, extracted by the shared feature layer.

Optionally, in any embodiment of the present disclosure, the outputting the second feature data meeting the set standard includes: outputting the second feature data meeting a first set dimension, wherein the first set dimension is same as a feature dimension of a first shared hidden layer at a first layer of the first shared hidden unit.

Optionally, in any embodiment of the present disclosure, the inputting the second feature data into the first shared hidden unit of the autoencoder, to map the second feature data to the set feature space through the first shared hidden unit, and outputting the mapping data, includes: inputting the second feature data into the first shared hidden unit, which is shared by outputs of the plurality of first unshared hidden units; and mapping the second feature data to the set feature space through weight matrixes and offset vectors of respective first shared hidden layers of the first shared hidden unit, and outputting the mapping data.

Optionally, in any embodiment of the present disclosure, the inputting the mapping data into the shared feature layer of the autoencoder, and outputting the common feature data in the first feature data, extracted by the shared feature layer, includes: inputting the mapping data into the shared feature layer of the autoencoder, and calculating the common feature data in the first feature data by the shared feature layer according to the mapping data, and a weight matrix and an offset vector of the shared feature layer.

Optionally, in any embodiment of the present disclosure, the autoencoder includes an encoder, the shared feature layer and a decoder, the encoder includes the first shared hidden unit and the plurality of first unshared hidden units, the decoder includes a second shared hidden unit and a plurality of second unshared hidden units, the second shared hidden unit and the first shared hidden unit are symmetrical about the shared feature layer, and respective second unshared hidden units and corresponding first unshared hidden units are symmetrical about the shared feature layer; and before acquiring the first feature data and the source identification of the data to be processed, the method further includes: training the autoencoder by using training samples acquired from a plurality of data sources.

Optionally, in any embodiment of the present disclosure, before training the autoencoder by using the training samples acquired from the plurality of data sources, the method further includes: setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples.

Optionally, in any embodiment of the present disclosure, the training the autoencoder by using the training samples acquired from the plurality of data sources, includes: acquiring the first feature data and corresponding source identifications of the training samples, and inputting the first feature data into first unshared hidden units, corresponding to the source identifications, in the encoder; processing the first feature data by the first unshared hidden units and the first shared hidden unit of the encoder and the shared feature layer according to the source identifications, to obtain the common feature data corresponding to the first feature data; inputting the common feature data into the decoder and acquiring reconstructed data output by the decoder; and iteratively training the parameter in the encoder according to the reconstructed data, until a training termination condition is met.

Optionally, in any embodiment of the present disclosure, the iteratively training the parameter in the encoder according to the reconstructed data, until the training termination condition is met, includes: calculating a loss value according to a preset loss function, the first feature data of the training samples and the reconstruction data, and adjusting parameters of the first unshared hidden units corresponding to the source identifications and a parameter of the first shared hidden unit according to the loss value; and re-performing the acquiring the first feature data and the corresponding source identifications of the training samples, until the training termination condition is met.

In a second aspect, an embodiment of the present disclosure provides an electronic device, including: one or more processors; and a computer-readable medium, configured for storing one or more programs, wherein the one or more programs, when executed by the one or more processors, cause the one or more processors to implement the method as described in the above first aspect.

In a third aspect, an embodiment of the present disclosure provides a computer-readable medium, storing a computer program, wherein the computer program, when executed by a processor, implements the method as described in the above first aspect.

BRIEF DESCRIPTION OF THE DRAWINGS

To describe the solutions of the present disclosure or the prior art more clearly, the accompanying drawings to be used in the embodiments will are described briefly below. Evidently, the accompanying drawings described below are merely some drawings recited in the present disclosure. Those skilled in the art can obtain other drawings based on these drawings.

DETAILED DESCRIPTION

Figure 1:
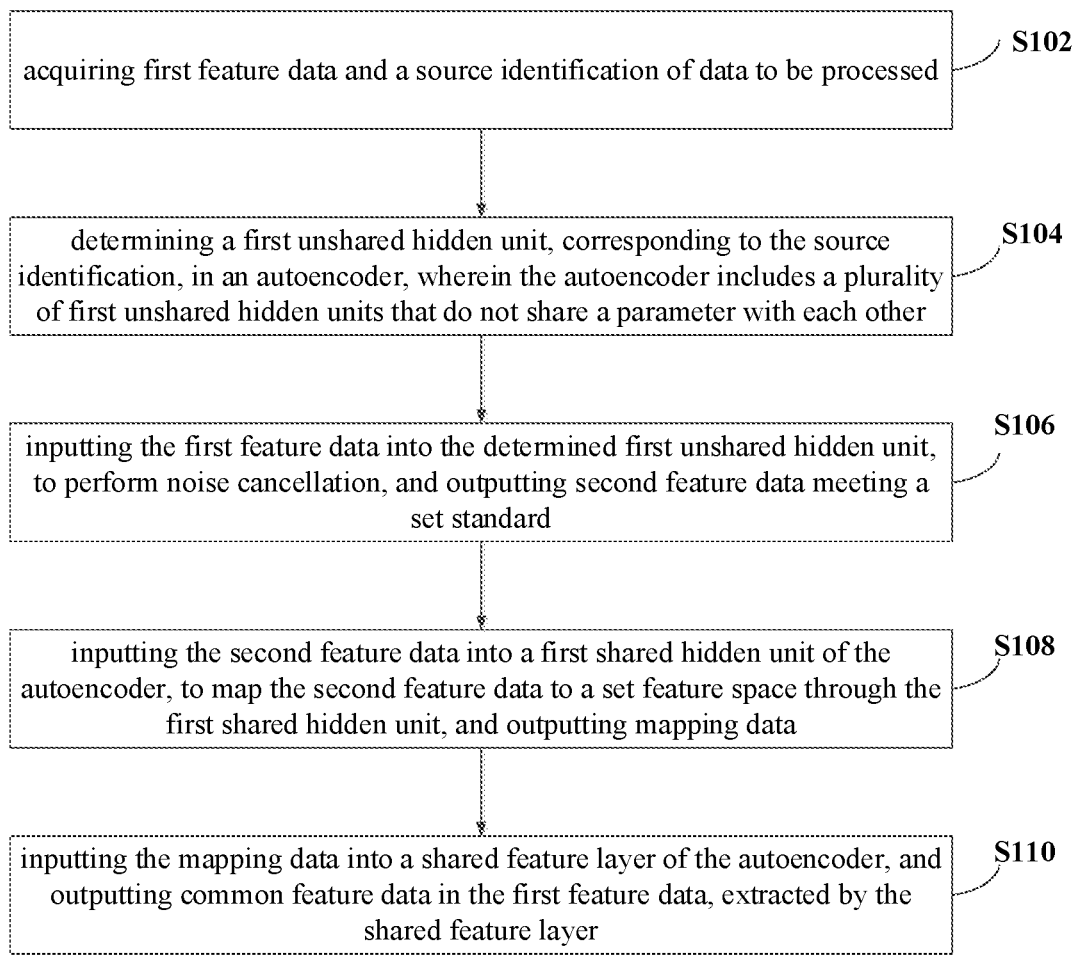
FIG. 1 is a schematic flowchart of a data processing method of a first embodiment of the present disclosure.

The present disclosure will be further described in detail below in combination with the drawings and embodiments. It can be understood that the specific embodiments described herein are only configured to explain the relevant invention and not to limit the present disclosure. In addition, it should be noted that for ease of description, only parts related to the relevant invention are shown in the drawings.

It should be noted that, the features of the embodiments and embodiments in the present disclosure may be combined with each other, without conflict. The present disclosure will be described in detail with reference to the accompanying drawings and in combination with the embodiments.

First Embodiment

FIG. 1 is a schematic flowchart of a data processing method of a first embodiment of the present disclosure. As shown in FIG. 1, the method includes:

Step S102: acquiring first feature data and a source identification of data to be processed.

In this embodiment, the data to be processed may be any type of data, for example, audio data or image data, etc. Feature extraction is performed on different types of data to be processed, to obtain the first feature data, and there may be different types and different extraction manners of the first feature data. Those skilled in the art can extract the required first feature data in an appropriate way according to demands, which is not limited in this embodiment. The first feature data may be in vector, matrix or other forms.

For example, if the data to be processed is voice data, the first feature data can be voice acoustic feature data, such as rhythm, spectrum, tone quality, etc. An MFCC (Mel Frequency Cepstral Coefficients) extraction manner can be used to extract the voice acoustic feature data.

For another example, if the data to be processed is image data containing a face, the first feature data can be an HOG (Histogram of Oriented Gradient) feature, an LBP (Local Binary Pattern) feature, and an Haar feature, etc. Different first feature data can be obtained by performing the feature extraction in appropriate ways.

The source identification is used to indicate the source of the corresponding data to be processed, to distinguish difference-source data to be processed. For example, if the data to be processed is data acquired by an acquisition device A, the data to be processed has a source identification different from that of data acquired by an acquisition device B, and so on. Different data sources can refer to different acquisition devices, different acquisition environments, etc. Those skilled in the art can set an appropriate identification as the source identification as required, which is not limited in this embodiment.

Step S104: determining a first unshared hidden unit, corresponding to the source identification, in an autoencoder, wherein the autoencoder includes a plurality of first unshared hidden units that do not share a parameter with each other.

The autoencoder is an unsupervised neural network model, and can learn the hidden features of input data, which is called as coding. At the same time, the learned new features can be used to reconstruct original input data, which is called as decoding. In a practical application, those skilled in the art can configure an autoencoder with an appropriate network structure as required.

In this embodiment, taking the autoencoder as a neural network based on a 0 neural network algorithm (deep neural network algorithm) as an example, the autoencoder includes a plurality of first unshared hidden units, a shared hidden unit and a shared feature layer. Of course, in other embodiments, the autoencoder can include other units as required.

Each first unshared hidden unit in the autoencoder is used to process the first feature data of a data source correspondingly. For example, the first unshared hidden unit A is used to process the first feature data with the source identification 1, the second unshared hidden unit B is used to process the second feature data with the source identification 2, and so on.

Each of respective first unshared hidden units can be a unit composed of one or more hidden layers. "Unshared" means that parameters of different first unshared hidden units are unshared. The parameter in each first unshared hidden unit can be a parameter independently learned through machine learning manner. In this way, it can be ensured that each first unshared hidden unit has a good processing effect on the first feature data of its corresponding data source.

Those skilled in the art can indicate the data sources corresponding to the respective first unshared hidden units in any appropriate way. For example, data source identifications are set for the respective first unshared hidden units, to indicate their corresponding data sources. The data source identification can be numbers, letters, hashes, and so on.

For the acquired first feature data of the data to be processed, the first unshared hidden unit corresponding to the first feature data can be determined according to the matching relationship between the source identification and the data source identification.

The autoencoder includes a first shared hidden unit, which is shared by the data to be processed of all data sources. The first shared hidden unit is a unit composed of one or more hidden layers, and is connected after the respective first unshared hidden units, for processing the output data of the respective first unshared hidden units.

The shared feature layer is connected after the first shared hidden unit, and is shared by the data to be processed of all data sources, to extract the common feature data in the first feature data of the data to be processed.

Step S106: inputting the first feature data into the determined first unshared hidden unit, to perform noise cancellation, and outputting second feature data meeting a set standard.

In this embodiment, the first unshared hidden unit is used to perform noise cancellation on the input first feature data, to remove noise data introduced in the first feature data due to the acquisition device, the collecting environment, etc., and output the second feature data meeting the set standard.

Since the parameters in the first unshared hidden units corresponding to different data sources are unshared, each of the first unshared hidden units can be targeted to perform the noise elimination on the first feature data of the corresponding data source, to ensure the effect of the noise elimination.

Those skilled in the art can set an appropriate standard as required, such that the first unshared hidden unit outputs the second feature data meeting the set standard. For example, the set standard can be used to define the type of the second feature data, such as a vector or matrix, etc., and can also be used to define the dimension of the second feature data, whether to use sparse representation, and the like.

Step S108: inputting the second feature data into a first shared hidden unit of the autoencoder, to map the second feature data to a set feature space through the first shared hidden unit, and outputting mapping data.

The first shared hidden unit is used to process the second feature data. Since the first shared hidden unit is shared by the first unshared hidden units of all data sources, the second feature data output by each of the first unshared hidden units, after being processed by the first shared hidden unit, is mapped into the same set feature space, and the mapping data is output, so as to subsequently perform the common feature extraction.

The set feature space may be a feature space determined according to the first shared hidden unit, for example, it may be a space with a dimension same as the dimension of the last first shared hidden layer in the first shared hidden unit. Those skilled in the art can configure the first shared hidden unit as required, such that the feature space is the required feature space.

The mapping data output via the mapping may be a vector or matrix with a dimension same as the dimension of the last first shared hidden layer.

Step S110: inputting the mapping data into a shared feature layer of the autoencoder, and outputting common feature data in the first feature data, extracted by the shared feature layer.

The shared feature layer is used to process the input mapping data, to extract the common feature data in the first feature data.

The common feature data refers to the feature data, in the same type of data to be processed, that is common to this type. For example, the common feature data can be voice acoustic feature data in voice data expressed in the form of vector or matrix. The common feature data extracted through the shared feature layer retains common features in the data to be processed, and does not include noise data, and therefore, the common feature data can be used as training samples of other subsequent neural network models, thereby solving the problem of poor performance of the trained neural network model due to various noise data in the difference-source data when using the difference-source data as the training samples to train the neural network model in the prior art.

Through this embodiment, the autoencoder is used to process the data to be processed from various data sources, remove the noise data in respective data to be processed, and extract the common feature data therefrom as the training samples of other subsequent neural network models, thereby solving the problem of the poor performance of the trained neural network model due to directly training the neural network model by using training samples from different data sources in the prior art. For the data to be processed from a certain data source, the first unshared hidden unit corresponding to the data source thereof is used to perform noise elimination on the data to be processed, to ensure the effect of the noise elimination, and output the second feature data; and the second feature data is processed by the shared hidden unit, mapped to the set feature space, and the common feature data therein is extracted through the shared feature layer. In this way, no matter where the data comes from and whether the sources are the same, the common feature data therein can be conveniently and accurately extracted as the training samples of other subsequent neural network models, thereby solving the problems of high cost of collecting training samples corresponding to the difference-source data and poor performance of the trained neural network model in the prior art.

Second Embodiment

In this embodiment, in order to clearly illustrate the data processing solution provided by the embodiment of the present disclosure, first, a specific example is given to illustrate exemplarily the structure of the autoencoder.

Figure 2:
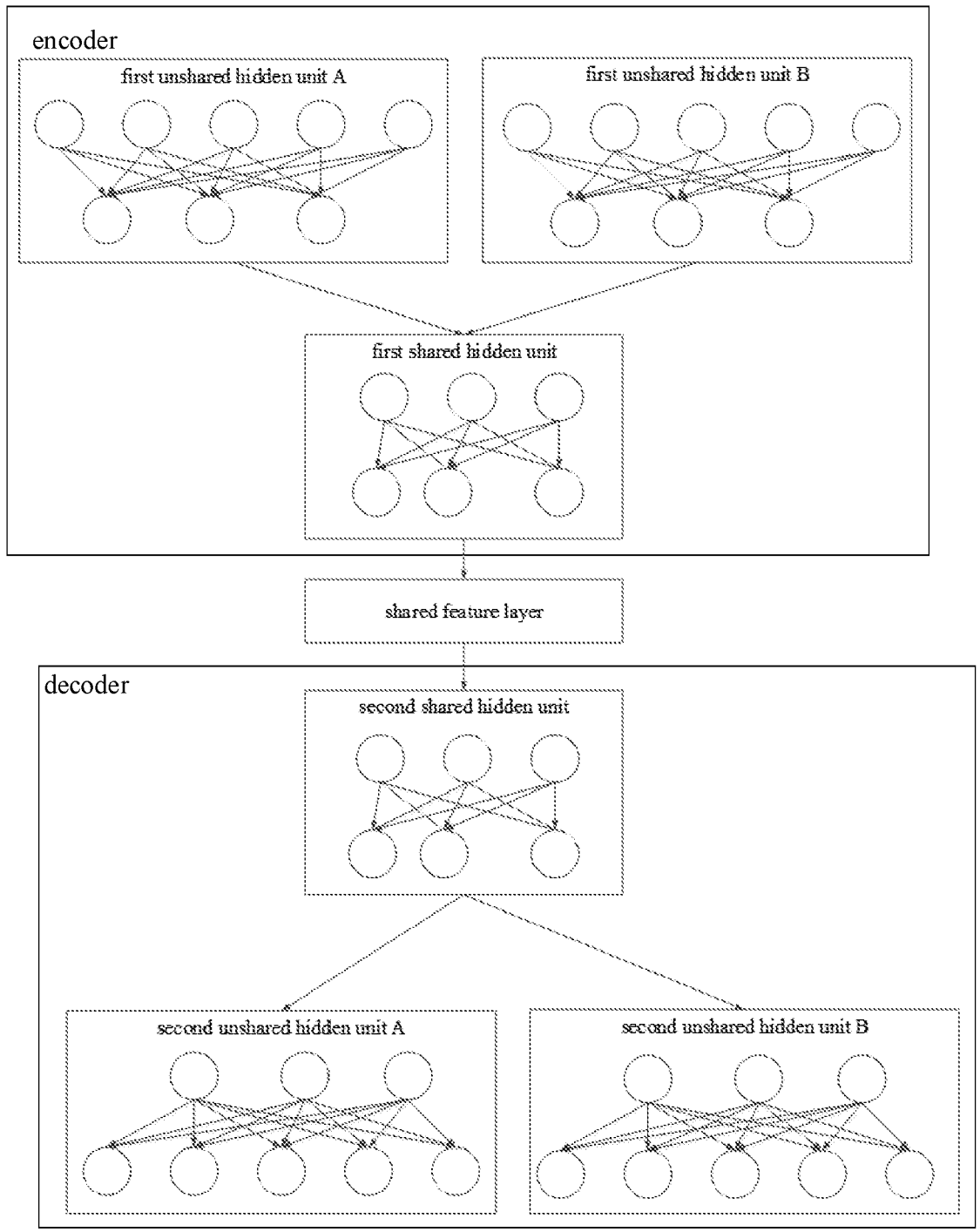
FIG. 2 is a schematic structural diagram of an autoencoder in a second embodiment of the present disclosure.

As shown in FIG. 2, FIG. 2 is a structural block diagram of an autoencoder. The autoencoder includes an encoder, a shared feature layer and a decoder, wherein the structure of the encoder and the structure of the decoder are symmetrical about the shared feature layer.

Herein, the encoder includes a plurality of first unshared hidden units and a first shared hidden unit. The plurality of first unshared hidden units are arranged in parallel for processing the features of the first feature data from different data sources, to eliminate the influence of noise and obtain the second feature data meeting the set standard.

The first shared hidden unit is arranged after the plurality of first unshared hidden units, for mapping the second feature data to the same set feature space to generate the mapping data, such that the common feature data of the mapping data is extracted by the shared feature layer arranged after the first shared hidden unit.

The decoder includes a second unshared hidden unit and a plurality of second unshared hidden units. Herein, the second shared hidden unit is connected after the shared feature layer, the structure of the second shared hidden unit and the structure of the first shared hidden unit are symmetrical about the shared feature layer, and the parameter in the second shared hidden unit is consistent with the parameter at the corresponding position in the first shared hidden unit. That is, the first second shared hidden layer of the second shared hidden unit is consistent with the last first shared hidden layer of the first shared hidden unit. The first second shared hidden layer is used to inversely map the common feature data and output inverse mapping data.

The plurality of second unshared hidden units are connected after the second shared hidden layer. The second unshared hidden unit and the first unshared hidden unit are symmetrical about the shared feature layer, and the parameters in the second unshared hidden unit is consistent with the parameter at the corresponding position in the corresponding first unshared hidden unit. That is, the first second unshared hidden layer of the second unshared hidden unit is consistent with the last first unshared hidden layer of the corresponding first unshared hidden unit. Each of the second unshared hidden units are used to reconstruct the inverse mapping data of the corresponding data sources into reconstructed data.

Figure 3:
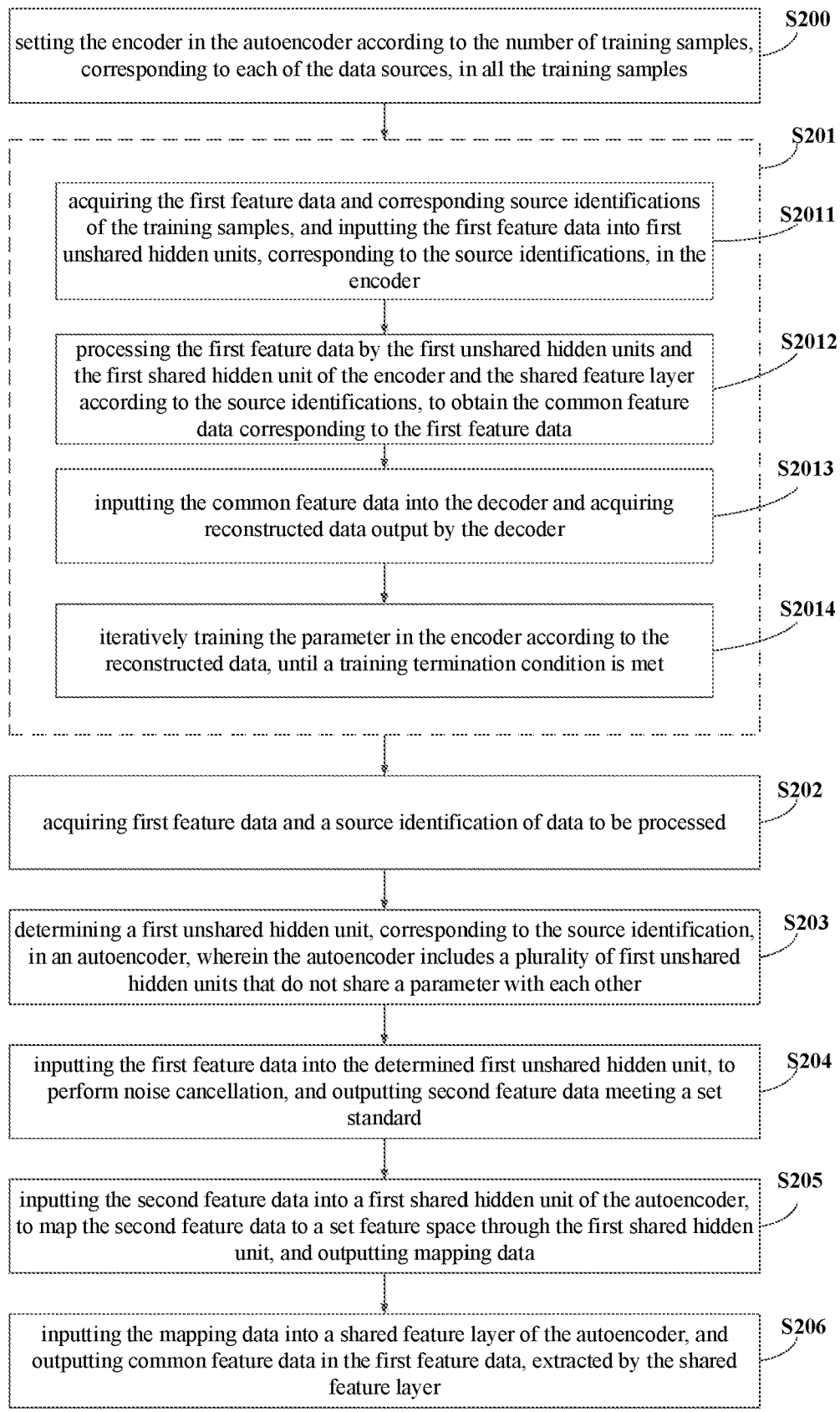
FIG. 3 is a schematic flowchart of a data processing method of the second embodiment of the present disclosure.

Based on the autoencoder with the above structure, the data processing method of the second embodiment of the present disclosure is shown in FIG. 3. The method includes:

Step S200: setting the encoder in the autoencoder according to the number of training samples, corresponding to each of the data sources, in all the training samples.

S200 includes: setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples.

In the prior art, when directly training the autoencoder by using training samples from different data sources, the training samples from the different data sources contain different noise data, and the number of the training samples corresponding to the different data sources is different, wherein the number of training samples corresponding to some data sources is large, while the number of training samples corresponding to some data sources is small, this results in that the autoencoder trained by using these training samples will focus to the data source scene with a large number of training samples when outputting the result, which will affect the performance of the trained autoencoder removing the noise.

Setting dimensions of the first unshared hidden units, corresponding to respective data sources, of the autoencoder according to the number of training samples corresponding to the respective data sources can prevent the trained autoencoder from being affected by the training samples with a large data amount, ensure that the trained autoencoder can have a better noise elimination effect on the data to be processed from any data source, and can accurately extract the common feature data in the data to be processed. The common feature data extracted by the shared feature layer of the trained autoencoder can be used as training samples of other neural network models. Because the common feature data does not contain noise data, the neural network model trained by using the common feature data can have better performance.

In a specific implementation, the number of hidden nodes of respective first unshared hidden layers of the first unshared hidden units corresponding to different data sources can be set according to the data amount of the training samples of the data sources. When a first unshared hidden unit includes a plurality of first unshared hidden layers, the number of hidden nodes of the next first unshared hidden layer is less than the number of hidden nodes of the previous first unshared hidden layer. This can play a role in reducing the feature dimension. The number of hidden nodes of the last first unshared hidden layer of the first unshared hidden unit is the same as the number of hidden nodes of the first first shared hidden layer of the first shared hidden unit, such that the dimension of the second feature data output by the first unshared hidden unit meets the input requirement of the first shared hidden unit, and then the second feature data can be used as the input data of the first shared hidden unit without need of additional processing.

Step S201: training the autoencoder by using training samples acquired from a plurality of data sources.

In a specific implementation, the step S201 includes the following sub-steps:

Sub-step S2011: acquiring the first feature data and corresponding source identifications of the training samples, and inputting the first feature data into first unshared hidden units, corresponding to the source identifications, in the encoder.

For example, the first feature data is acquired from the training samples by means of feature extraction, and the preset source identifications in the training samples are acquired. For different types of training samples, first feature data extracted therefrom may be different.

When determining the corresponding first unshared hidden unit, the first unshared hidden unit corresponding to a preset source identification can be determined according to the matching relationship between the preset source identification and the first unshared hidden unit. Or, if the data source identification is set on the first unshared hidden unit, the corresponding first unshared hidden unit can be determined by comparing whether the source identification is consistent with the data source identification, and the first feature data can be input into the corresponding first unshared hidden unit.

Sub-step S2012: processing the first feature data by the first unshared hidden units and the first shared hidden unit of the encoder and the shared feature layer according to the source identifications, to obtain the common feature data corresponding to the first feature data.

The implementation process of this step can adopt the implementation process of step S104 to step S110 in the first embodiment, which will not be repeated in this embodiment.

Sub-step S2013: inputting the common feature data into the decoder and acquiring reconstructed data output by the decoder.

In this embodiment, the common feature data is input into the second shared hidden unit of the decoder. Since the second shared hidden unit and the first shared hidden unit are symmetrical about the shared feature layer, that is, the structure of the first second shared hidden layer of the second shared hidden unit is the same as the structure of the last first shared hidden layer of the first shared hidden unit, the second shared hidden unit performs inverse processing opposite to the first shared hidden unit on the common feature data, and outputs the inverse mapping data corresponding to the second feature data, such that the inverse mapping data is as close as possible to the second feature data.

After acquiring the inverse mapping data, the inverse mapping data is input into the second unshared hidden unit corresponding to the data source, and the second unshared hidden unit processes the inverse mapping data and obtain the output reconstructed data corresponding to the first feature data, such that the reconstructed data is as close as possible to the first feature data.

Sub-step S2014: iteratively training the parameter in the encoder according to the reconstructed data, until a training termination condition is met.

In this embodiment, the sub-step S2014 includes: calculating a loss value according to a preset loss function, the first feature data of the training samples and the reconstruction data, and adjusting parameters of the first unshared hidden units corresponding to the source identifications and a parameter of the first shared hidden unit according to the loss value; and re-performing the acquiring the first feature data and the corresponding source identifications of the training samples, until the training termination condition is met.

Herein, the preset loss function can be:

$$\text{loss} = \sum_{s=1}^{S}\sum_{n=1}^{N_s}(v_{sn} - v'_{sn})^2 + \lambda\sum_{s=1}^{S}\sum_{m=1}^{M}\|W_{sm}\|^2 + \lambda\sum_{k=1}^{K}\|W_k\|^2 + \lambda\|W\|^2$$

wherein, loss is the loss value. s refers to the s-th data source, the value of s ranges from 1 to S, and S refers to the total number of data sources. n refers to the n-th training sample of the s-th data source. The value of n ranges from 1 to $N_s$, and $N_s$ is the total number of training samples of the s-th data source. $v_{sn}$ is the first feature data. $v'_{sn}$ is the reconstructed data. $W_{sm}$ is the weight matrix of the m-th first unshared hidden layer of the first unshared hidden unit, corresponding to the s-th data source, in the encoder, the value of m ranges from 1 to M, and M refers to the total layer number of the first unshared hidden layers contained in the first unshared hidden unit corresponding to the s-th data source. $W_k$ is the weight matrix of the k-th first shared hidden layer of the first shared hidden unit in the encoder, the value of k ranges from 1 to K, and K refers to the total layer number of the first shared hidden layers contained in the first shared hidden unit. W is the weight matrix of the shared feature layer. $\lambda$ is a weight attenuation item, whose value is between 0 and 1. $\|W_{sm}\|$ refers to solving L2 norm of $W_{sm}$, $\|W_k\|$ refers to solving L2 norm of $W_k$, and $\|W\|$ refers to solving L2 norm of W. The first term of the loss function is used to calculate the mean square error, and L2 regularization is added to the last three terms of the loss function, to prevent over fitting of the autoencoder.

The whole autoencoder is trained using the minimum loss function as described in the above formula, that is, parameters $W_{sm}$, $W_k$, W, $b_{sm}$, $b_k$, and b, etc. of the autoencoder are obtained by training.

Those skilled in the art can configure an appropriate training termination condition as required. For example, the training termination condition may be that the number of training times reaches a set value, or the loss value is less than a set value, etc.

Through the above process, the training of the autoencoder is completed. The trained autoencoder can be used for a long time in the future. For example, the encoder and the shared feature layer in the trained autoencoder process the first feature data of the data to be processed, to obtain the common feature data. In this embodiment, a process of acquiring the common feature data by the encoder and the shared feature layer in the trained autoencoder is described in steps S202 to S206.

Step S202: acquiring first feature data and a source identification of data to be processed.

This step is consistent with the above embodiment, which refers to the above first embodiment for details, and will not be repeated here.

Step S203: determining a first unshared hidden unit, corresponding to the source identification, in an autoencoder, wherein the autoencoder includes a plurality of first unshared hidden units that do not share a parameter with each other.

This step is consistent with the above first embodiment, which refers to the above first embodiment for details, and will not be repeated here.

Step S204: inputting the first feature data into the determined first unshared hidden unit, to perform noise cancellation, and outputting second feature data meeting a set standard.

This step is consistent with the above embodiment, which refers to the above first embodiment for details, and will not be repeated here.

It should be noted that in this embodiment, the outputting the second feature data meeting the set standard includes: outputting the second feature data meeting a first set dimension, wherein the first set dimension is same as a feature dimension of a first shared hidden layer at a first layer of the first shared hidden unit. In this way, it is more convenient to input the output second feature data as input data into the first shared hidden unit without need of additional processing, such that the loss of features caused by the additional processing can be prevented.

Step S205: inputting the second feature data into a first shared hidden unit of the autoencoder, to map the second feature data to a set feature space through the first shared hidden unit, and outputting mapping data.

In this embodiment, the step S205 includes: inputting the second feature data into the first shared hidden unit, which is shared by outputs of the plurality of first unshared hidden units; and mapping the second feature data to the set feature space through weight matrixes and offset vectors of respective first shared hidden layers of the first shared hidden unit, and outputting the mapping data.

By using the weight matrixes and offset vectors of the respective first shared hidden layers of the first shared hidden unit to process the second feature data, the second feature data output by different first unshared hidden units can be mapped to the same set feature space, so as to facilitate the subsequent shared feature layer to extract the common feature data.

In this embodiment, the mapping data is the data obtained after calculation according to the weight matrix, offset vector and second feature data of the last first shared hidden layer.

Of course, in other embodiments, those skilled in the art can map respective second feature data into the set feature space in other ways as required.

Step S206: inputting the mapping data into a shared feature layer of the autoencoder, and outputting common feature data in the first feature data, extracted by the shared feature layer.

In this embodiment, the step S206 includes: inputting the mapping data into the shared feature layer of the autoencoder, and calculating the common feature data in the first feature data by the shared feature layer according to the mapping data, and a weight matrix and an offset vector of the shared feature layer.

The weight matrix and offset vector of the shared feature layer can be the weight matrix and offset vector obtained after training in the above step S201.

In the shared feature layer, the common feature data in the feature data is calculated according to the mapping data, and the weight matrix and offset vector of the shared feature layer, which can ensure the effect of extracting the common feature data, and then can ensure the effect when using the extracted common feature data as training samples to train other neural network models.

Through this embodiment, on the one hand, the autoencoder is used to process the data to be processed from various data sources, remove the noise data in respective data to be processed, and extract the common feature data therefrom as the training samples of other subsequent neural network models, thereby solving the problem of the poor performance of the trained neural network model due to directly training the neural network model by using training samples from different data sources in the prior art. For the data to be processed from a certain data source, the first unshared hidden unit corresponding to the data source thereof is used to perform noise elimination on the data to be processed, to ensure the effect of the noise elimination, and output the second feature data; and the second feature data is processed by the shared hidden unit, mapped to the set feature space, and the common feature data therein is extracted through the shared feature layer. In this way, no matter where the data comes from and whether the sources are the same, the common feature data therein can be conveniently and accurately extracted as the training samples of other subsequent neural network models, thereby solving the problems of high cost of collecting training samples corresponding to the difference-source data and poor performance of the trained neural network model in the prior art.

On the other hand, the autoencoder can include a decoder during training, and can include no decoder in subsequent use after training, which helps to reduce the amount of calculation during use. The decoder reconstructs the data from different data sources by using the common feature data extracted by the shared feature layer, and outputs the reconstructed data. The autoencoder is trained by the deviation between the first feature data and the corresponding reconstructed data as a loss function.

After the training of the autoencoder is completed, the data to be processed from different data sources are input into the autoencoder, and the output of the shared feature layer of the autoencoder is used as the common feature data of the data to be processed. In the process of extracting the common feature data, noise information, not related to the common feature, in the data to be processed is removed by the autoencoder, which can eliminate the impact on the extracted common feature due to different data sources, thereby improving the accuracy of subsequently training other neural network models by using the common feature data.

The dimension (H) of the extracted common feature data can be set to be smaller than the dimension (F) of the first feature data (i.e., H<F), to achieve the purpose of automatic feature dimensionality reduction.

In addition, according to the different amount of training sample data from different data sources, the corresponding dimension of the first unshared hidden layer can be configured, so as to comprehensively consider the impact of the data amount of training samples on the performance of the autoencoder, not rendering the trained autoencoder focused to the data source scenario with a large data amount.

The training process of the autoencoder will be illustrated in combination with a specific use scenario below.

In this use scenario, there are S data sources, and each of the data sources corresponds to a first unshared hidden unit. It is assumed that the s-th data source contains a total of $N_s$ training samples, and the value of s ranges from 1 to S. The first unshared hidden unit corresponding to the s-th data source is recorded as Bs. The first unshared hidden unit Bs contains a total of M first unshared hidden layers, in which the number of nodes of the m-th first unshared hidden layer (i.e., the dimension of this first unshared hidden layer) is recorded as $D_{sm}$, and the value of m ranges from 1 to M.

The training process specifically includes:

Step A: recording the acquired n-th data from the s-th data source as the first feature data of the training sample A. The value of n ranges from 1 to $N_s$. The first feature data of the training sample A is recorded as $v_{sn}$, wherein $v_{sn}$ a vector or a matrix. In this use scenario, it is a vector with the dimension of F×1, and is used to represent the feature of the training sample A.

Step B: inputting the first feature data $v_{sn}$ of the training sample A into the first unshared hidden unit Bs.

The process of the first unshared hidden unit Bs processing the first feature data $v_{sn}$ can be expressed as:

when m=1, the processing of the input data by the first unshared hidden layer is expressed as:

$$z_{s1n} = W_{s1} v_{sn} + b_{s1}$$

$$h_{s1n} = f(z_{s1n})$$

wherein, $W_{s1} \in \mathbb{R}^{D_{s1} \times F}$ is the weight matrix of the first first unshared hidden layer of the first unshared hidden unit Bs, and its dimension is $D_{s1} \times F$.

$b_{s1} \in \mathbb{R}^{D_{s1}}$ is the offset vector of the first first unshared hidden layer of the first unshared hidden unit Bs, and its dimension is $D_{s1}$.s $Z_{s1n}$ indicates the result calculated according to the weight matrix and offset vector of this layer.

f(•) is a linear function, such as a sigmoid function, and is used to perform dimensionality reduction processing.

$h_{s1n}$ is the hidden vector representation of the first first unshared hidden layer corresponding to the n-th piece of data of the s-th data source, and its dimension is $D_{s1} \times 1$.

When 1<m<M, the processing of the input data by the first unshared hidden layer is expressed as:

$$z_{smn} = W_{sm} h_{s(m-1)n} + b_{sm}$$

$$h_{smn} = f(z_{smn})$$

wherein, $W_{sm} \in \mathbb{R}^{D_{sm} \times D_{s(m-1)}}$ is the weight matrix of the m-th first unshared hidden layer corresponding to the s-th data source, and its dimension is $D_{sm} \times D_{s(m-1)}$.

$b_{sm} \in \mathbb{R}^{D_{sm}}$ is the offset vector of the m-th first unshared hidden layer of the s-th data source, and its dimension is $D_{sm}$.

$Z_{smn}$ indicates the result calculated according to the weight matrix and offset vector of this layer.

$h_{smn}$ is the hidden vector representation of the m-th first unshared hidden layer corresponding to the n-th piece of data of the s-th data source, and its dimension is $D_{sm} \times 1$.

When m=M, the processing of the input data by the first unshared hidden layer is expressed as:

$$z_{sMn} = W_{sM} h_{s(M-1)n} + b_{sM}$$

$$h_{sMn} = f(z_{sMn})$$

wherein, $W_{sM} \in \mathbb{R}^{H \times D_{s(M-1)}}$ is the weight matrix of the M-th first unshared hidden layer corresponding to the s-th data source, and its dimension is $H \times D_{s(M-1)}$.

$b_{sM} \in \mathbb{R}^{H}$ is the offset vector of the M-th first unshared hidden layer corresponding to the s-th data source, and its dimension is H.

$Z_{sMn}$ indicates the result calculated according to the weight matrix and offset vector of this layer.

$h_{sMn}$ is the hidden vector representation of the M-th first unshared hidden layer corresponding to the n-th piece of data of the s-th data source, that is, the second feature data output by the first unshared hidden unit of the encoder, and its dimension is $H \times 1$.

Step C: inputting the second feature data $h_{sMn}$ output by the first unshared hidden unit into the first shared hidden unit.

In this use scenario, it is assumed that the first shared hidden unit includes a total of K first shared hidden layers, and the dimensions of respective first shared hidden layers are the same, and are H, that is, the number of hidden nodes of each of the respective first shared hidden layers is the same, and is H.

Therefore, the second feature data $h_{sMn}$ is input into the first shared hidden unit, and the process of processing the input data by the k-th (the value of k ranges from 1 to K) first shared hidden layer of the first shared hidden unit is:

when k=1, the processing of the input data by the first shared hidden layer is expressed as:

$$y_{s1n} = W_1 h_{sMn} b_1$$

$$g_{s1n} = f(y_{s1n})$$

wherein, $W_1 \in \mathbb{R}^{H \times H}$ is the weight matrix of the first first shared hidden layer, and its dimension is $H \times H$.

$b_{s1} \in \mathbb{R}^{H}$ is the offset vector of the first first shared hidden layer, and its dimension is H.

$y_{s1n}$ indicates the result calculated according to the weight matrix and offset vector of this layer.

$f(y_{s1n})$ is a linear function, such as a sigmoid function, and is used to perform the dimensionality reduction processing.

$g_{s1n}$ is the hidden vector representation of the first first shared hidden layer corresponding to the n-th piece of data of the s-th data source, and its dimension is $H \times 1$.

When k>1, the processing of the input data by the first shared hidden layer is expressed as:

$$y_{skn} = W_{skn} + b_k$$

$$g_{skn} = f(y_{skn})$$

wherein, $W_k \in \mathbb{R}^{H \times H}$ is the weight matrix of the first first shared hidden layer, and its dimension is $H \times H$.

$b_k \in \mathbb{R}^{H}$ is the offset vector of the first first shared hidden layer, and its dimension is H.

$y_{skn}$ indicates the result calculated according to the weight matrix and offset vector of this layer.

$g_{sKn}$ is the hidden vector representation of the k-th first shared hidden layer corresponding to the n-th piece of data of the s-th data source, and its dimension is $H \times 1$.

The parameters of respective first shared hidden layers are shared for different data sources, and the first shared hidden unit maps the second feature data converted via the first unshared hidden unit to the same set feature space. The output of the encoder for the n-th training sample A from the s-th data source is $g_{sKn}$ (i.e., the mapping data), that is, the data output by the k-th first shared hidden layer, and its dimension is $H \times 1$.

Step D: inputting the mapping data $g_{sKn}$ output by the first shared hidden unit into the shared feature layer.

The shared feature layer is used to extract the common feature data. It is assumed that the number of hidden nodes of the shared feature layer is H, which is the same as the number of hidden nodes of the first shared hidden unit of the encoder, therefore, $g_{sKn}$ is input into the shared feature layer, and the processing of the input data by the shared feature layer can be expressed as:

$$y_{sn} = W g_{sKn} + b$$

$$g_{sn} = f(y_{sn})$$

wherein, $W \in \mathbb{R}^{H \times H}$ is the weight matrix of the shared feature layer, and its dimension is $H \times H$.

$b \in \mathbb{R}^{H}$ is the offset vector of the shared feature layer, and its dimension is H.

$y_{sn}$ indicates the result calculated according to the weight matrix and offset vector of this layer.

$g_{sn}$ is the hidden vector representation of the common feature data of the n-th piece of data of the s-th data source, and its dimension is $H \times 1$.

Step E: inputting the common feature data $g_{sn}$ into the decoder, and acquiring the reconstructed data output by the decoder.

The input of the decoder is the output of the shared feature layer, i.e., $g_{sn}$. $g_{sn}$ is input into the decoder, to be processed by the second shared hidden unit of the decoder, and the output data of the second shared hidden unit is input into the second unshared hidden unit, corresponding to the s-th data source, of the decoder, and the output data is acquired as the output of the decoder, which is recorded as $v'_{sn}$. $v'_{sn}$ is the reconstructed data, corresponding to $v_{sn}$, reconstructed by the decoder according to $g_{sn}$. The dimension of $v'_{sn}$ and the dimension of $v_{sn}$ are the same, which are $F \times 1$. The function of the decoder is to obtain $v'_{sn}$ from $g_{sn}$, to reconstruct as many input features $v_{sn}$ as possible.

Step F: after acquiring the reconstructed data $v'_{sn}$, calculating the loss value loss according to the loss function, the reconstructed data $v'_{sn}$ and the first feature data $v_{sn}$.

The loss function is as follows:

$$\text{loss} = \sum_{s=1}^{S} \sum_{n=1}^{N_s} (v_{sn} - v'_{sn})^2 + \lambda \sum_{s=1}^{S} \sum_{m=1}^{M} \|W_{sm}\|^2 + \lambda \sum_{k=1}^{K} \|W_k\|^2 + \lambda \|W\|^2$$

wherein, $W_{sm}$ is the weight matrix of the m-th first unshared hidden layer of the first unshared hidden unit, corresponding to the s-th data source, in the encoder. $W_k$ is the weight matrix of the k-th first shared hidden layer of the first shared hidden unit in the encoder. W is the weight matrix of the shared feature layer.

Step G: adjusting the parameters $W_{sm}$, $W_k$, W $b_{sm}$, $b_k$, and b, etc., according to the calculated loss value loss; and returning to and continuing to execute the step A until the termination condition is met.

Those skilled in the art can adjust the parameters $W_{sm}$, $W_k$, W, $b_{sm}$, $b_k$, and b in an appropriate way. After completing adjustment, the step A is returned to and continued to be executed until the training is completed.

Herein, $W_{sm}$ is the weight matrix of the m-th first unshared hidden layer of the first unshared hidden unit, corresponding to the s-th data source, in the encoder. $W_k$ is the weight matrix of the k-th first shared hidden layer of the first shared hidden unit in the encoder. W is the weight matrix of the shared feature layer. $b_{sm}$ is the offset vector of the m-th first unshared hidden layer of the first unshared hidden unit, corresponding to the s-th data source, in the encoder. $b_k$ is the offset vector of the k-th first shared hidden layer of the first shared hidden unit in the encoder. b is the offset vector of the shared feature layer.

It should be noted that in this use scenario, the parameters of respective first unshared hidden layers of respective first unshared hidden units are independently learned parameters, and the parameters between the first unshared hidden units are not shared. The parameters of respective first shared hidden layers of the first shared hidden unit are also independently learned parameters.

The parameters in the second shared hidden unit are configured to be consistent with the parameters at the corresponding positions in the first shared hidden unit. The parameters in respective second unshared hidden units are configured to be consistent with the parameters at the corresponding positions in the corresponding first unshared hidden units.

Through the above steps, the training of the autoencoder can be completed. The trained autoencoder can be used to implement the method of the above first embodiment or second embodiment to eliminate the noise data in the data to be processed from different data sources, and extract the common feature data therein to be used as the training samples of other neural network models, thereby solving the problems of poor performance of the trained neural network model and high cost of collecting the training samples due to directly using the difference-source data to train the neural network model in the prior art.

It should be noted that when using the trained autoencoder to extract the common feature data, only the encoder and the shared feature layer of the autoencoder can be used, or a complete autoencoder can be used.

Third Embodiment

Figure 4:
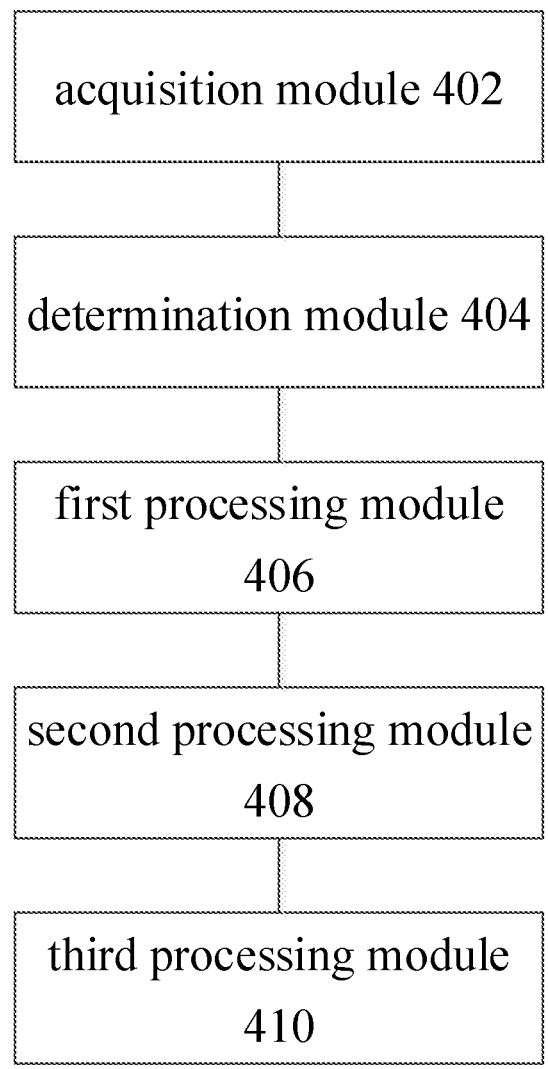
FIG. 4 is a structural block diagram of a data processing apparatus in a third embodiment of the present disclosure.

FIG. 4 is a structural block diagram of a data processing apparatus in a third embodiment of the present disclosure. As shown in FIG. 4, the data processing apparatus includes: an acquisition module 402, configured for acquiring first feature data and a source identification of data to be processed; a determination module 404, configured for determining a first unshared hidden unit, corresponding to the source identification, in an autoencoder, wherein the autoencoder includes a plurality of first unshared hidden units that do not share a parameter with each other; a first processing module 406, configured for inputting the first feature data into the determined first unshared hidden unit, to perform noise cancellation, and outputting second feature data meeting a set standard; a second processing module 408, configured for inputting the second feature data into a first shared hidden unit of the autoencoder, to map the second feature data to a set feature space through the first shared hidden unit, and outputting mapping data; and a third processing module 410, configured for inputting the mapping data into a shared feature layer of the autoencoder, and outputting common feature data in the first feature data, extracted by the shared feature layer.

In this embodiment, the autoencoder is used to process the data to be processed from various data sources, remove the noise data in respective data to be processed, and extract the common feature data therefrom as the training samples of other subsequent neural network models, thereby solving the problem of the poor performance of the trained neural network model due to directly training the neural network model by using training samples from different data sources in the prior art.

For the data to be processed from a certain data source, the first unshared hidden unit corresponding to the data source thereof is used to perform noise elimination on the data to be processed, to ensure the effect of the noise elimination, and output the second feature data; and the second feature data is processed by the shared hidden unit, mapped to the set feature space, and the common feature data therein is extracted through the shared feature layer. In this way, no matter where the data comes from and whether the sources are the same, the common feature data therein can be conveniently and accurately extracted as the training samples of other subsequent neural network models, thereby solving the problems of high cost of collecting training samples corresponding to the difference-source data and poor performance of the trained neural network model in the prior art.

Fourth Embodiment

Figure 5:
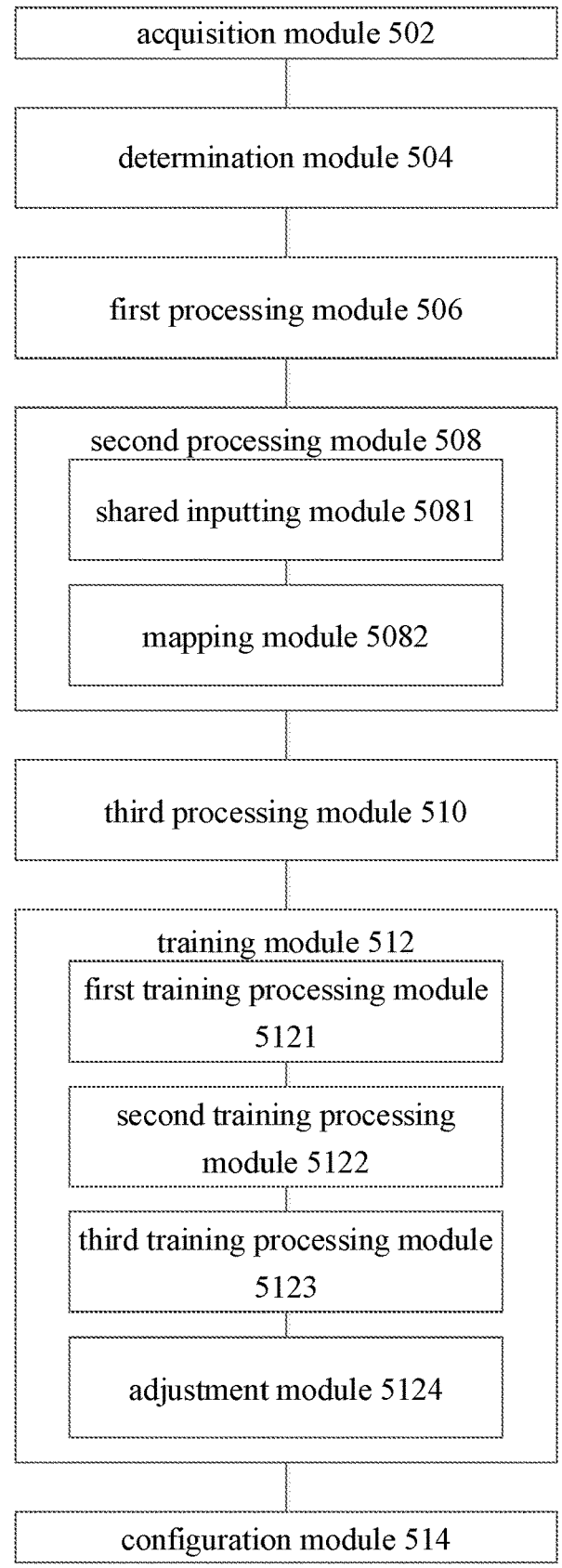
FIG. 5 is a structural block diagram of a data processing apparatus in a fourth embodiment of the present disclosure.

FIG. 5 is a structural block diagram of a data processing apparatus in a fourth embodiment of the present disclosure. As shown in FIG. 5, the data processing apparatus includes: an acquisition module 502, configured for acquiring first feature data and a source identification of data to be processed; a determination module 504, configured for determining a first unshared hidden unit, corresponding to the source identification, in an autoencoder, wherein the autoencoder includes a plurality of first unshared hidden units that do not share a parameter with each other; a first processing module 506, configured for inputting the first feature data into the determined first unshared hidden unit, to perform noise cancellation, and outputting second feature data meeting a set standard; a second processing module 508, configured for inputting the second feature data into a first shared hidden unit of the autoencoder, to map the second feature data to a set feature space through the first shared hidden unit, and outputting mapping data; and a third processing module 510, configured for inputting the mapping data into a shared feature layer of the autoencoder, and outputting common feature data in the first feature data, extracted by the shared feature layer.

Optionally, the first processing module 506 is configured for inputting the first feature data into the determined first unshared hidden unit, to perform the noise cancellation on the first feature data by the determined first unshared hidden unit, and outputting the second feature data meeting a first set dimension, wherein the first set dimension is same as a feature dimension of a first shared hidden layer at a first layer of the first shared hidden unit.

Optionally, the second processing module 508 includes: a shared inputting module 5081, configured for inputting the second feature data into the first shared hidden unit, which is shared by outputs of the plurality of first unshared hidden units; and a mapping module 5082, configured for mapping the second feature data to the set feature space through weight matrixes and offset vectors of respective first shared hidden layers of the first shared hidden unit, and outputting the mapping data.

Optionally, the third processing module 510 is configured for inputting the mapping data into the shared feature layer of the autoencoder, and calculating the common feature data in the first feature data by the shared feature layer according to the mapping data, and a weight matrix and an offset vector of the shared feature layer.

Optionally, the autoencoder includes an encoder, the shared feature layer and a decoder; the encoder includes the first shared hidden unit and the plurality of first unshared hidden units, the decoder includes a second shared hidden unit and a plurality of second unshared hidden units, the second shared hidden unit and the first shared hidden unit are symmetrical about the shared feature layer, and respective second unshared hidden units and corresponding first unshared hidden units are symmetrical about the shared feature layer; and the apparatus further includes: a training module 512, configured for, before acquiring the first feature data and the source identification of the data to be processed, training the autoencoder by using training samples acquired from a plurality of data sources.

Optionally, the apparatus further includes: a configuration module 514, configured for, before training the autoencoder by using the training samples acquired from the plurality of data sources, setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples.

Optionally, the training module 512 includes: a first training processing module 5121, configured for acquiring the first feature data and corresponding source identifications of the training samples, and inputting the first feature data into first unshared hidden units, corresponding to the source identifications, in the encoder; a second training processing module 5122, configured for processing the first feature data by the first unshared hidden units and the first shared hidden unit of the encoder and the shared feature layer according to the source identifications, to obtain the common feature data corresponding to the first feature data; a third training processing module 5123, configured for inputting the common feature data into the decoder and acquiring reconstructed data output by the decoder; and an adjustment module 5124, configured for iteratively training the parameter in the encoder according to the reconstructed data, until a training termination condition is met.

Optionally, the adjustment module 5124 is configured for calculating a loss value according to a preset loss function, the first feature data of the training samples and the reconstruction data, and adjusting parameters of the first unshared hidden units corresponding to the source identifications and a parameter of the first shared hidden unit according to the loss value; and re-performing the acquiring the first feature data and the corresponding source identifications of the training samples, until the training termination condition is met.

Through this embodiment, the autoencoder is used to process the data to be processed from various data sources, remove the noise data in respective data to be processed, and extract the common feature data therefrom as the training samples of other subsequent neural network models, thereby solving the problem of the poor performance of the trained neural network model due to directly training the neural network model by using training samples from different data sources in the prior art.

For the data to be processed from a certain data source, the first unshared hidden unit corresponding to the data source thereof is used to perform noise elimination on the data to be processed, to ensure the effect of the noise elimination, and output the second feature data; and the second feature data is processed by the shared hidden unit, mapped to the set feature space, and the common feature data therein is extracted through the shared feature layer. In this way, no matter where the data comes from and whether the sources are the same, the common feature data therein can be conveniently and accurately extracted as the training samples of other subsequent neural network models, thereby solving the problems of high cost of collecting training samples corresponding to the difference-source data and poor performance of the trained neural network model in the prior art.

Fifth Embodiment

This embodiment provides an electronic device. The electronic device can include:
one or more processors; and
a computer-readable medium, which can be configured for storing one or more programs,
wherein the one or more programs, when executed by the one or more processors, cause the one or more processors to implement the method in the above any embodiment.

Figure 6:
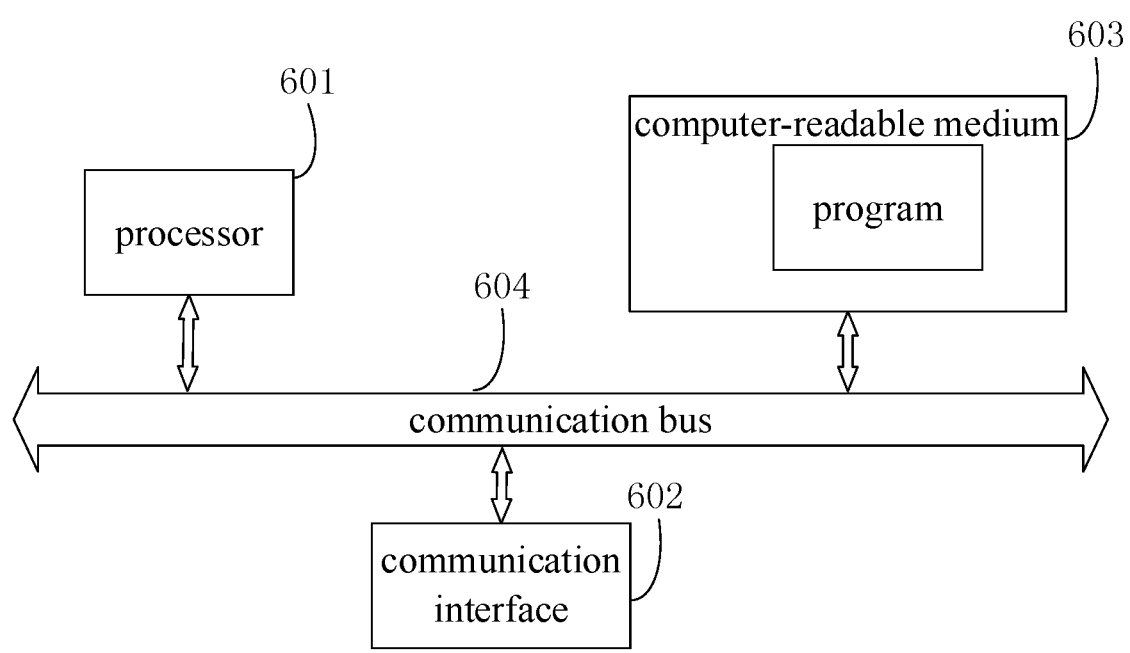
FIG. 6 is a hardware structure of an electronic device in a fifth embodiment of the present disclosure.

FIG. 6 is a hardware structure of an electronic device in the fifth embodiment of the present disclosure. As shown in FIG. 6, the hardware structure of the electronic device can include a processor 601, a communication interface 602, a computer-readable medium 603, and a communication bus 604;
wherein the processor 601, the communication interface 602 and the computer-readable medium 603 communicate with each other via the communication bus 604.

Optionally, the communication interface 602 may be an interface of a communication module, such as an interface of a GSM (Global System for mobile communications) module.

Herein, the processor 601 can be specifically configured for acquiring first feature data and a source identification of data to be processed; determining a first unshared hidden unit, corresponding to the source identification, in an autoencoder, wherein the autoencoder includes a plurality of first unshared hidden units that do not share a parameter with each other; inputting the first feature data into the determined first unshared hidden unit, to perform noise cancellation, and outputting second feature data meeting a set standard; inputting the second feature data into a first shared hidden unit of the autoencoder, to map the second feature data to a set feature space through the first shared hidden unit, and outputting mapping data; and inputting the mapping data into a shared feature layer of the autoencoder, and outputting common feature data in the first feature data, extracted by the shared feature layer.

The processor 601 can be a general processor including a CPU (Central Processing Unit), an NP (Network Processor) or the like, and can also be a DSP (Digital Signal Processor), an ASIC (Application Specific Integrated Circuit), an FPGA (Field-Programmable Gate Array) or other programmable logic components, discrete gates or transistor logic components, discrete hardware assemblies. The various methods, steps and logical block diagrams disclosed in the embodiments of the present disclosure can be implemented or executed. The general processor can be a microprocessor or this processor can also be any conventional processor or the like.

In the above embodiment, the electronic device can be an intelligent terminal at the front end, or can also be a server at the background.

In particular, according to the embodiment of the present disclosure, the process described above with reference to the flowchart can be implemented as a computer software program. For example, the embodiment of the present disclosure includes a computer program product including a computer program carried on a computer-readable medium, wherein the computer program contains program codes configured to execute the method shown in the flowchart. In such an embodiment, the computer program can be downloaded from the network through a communication part and installed, and/or can be installed from a removable medium. When the computer program is executed by a CPU, the above functions defined in the method of the present disclosure are executed.

It should be noted that the computer-readable medium described in the present disclosure can be a computer-readable signal medium or a computer-readable storage medium, or any combination of the above two. The computer-readable medium can be, for example, but is not limited to, an electrical, magnetic, optical, electromagnetic, infrared, or semiconductor system, apparatus, or component, or any combination of the above.

More specific examples of the computer-readable storage medium can include, but are not limited to, electrically connected, portable computer disks, hard disks, RAMs (Random Access Memory), ROMs (Read Only Memory), EPROMs (Electrically Programmable Read-Only-Memory), optical fibers and portable CD-ROMs (Compact Disc Read-Only-Memory), optical storage medium components, and magnetic storage medium components with one or more wires, or any suitable combination of the above.

In the present disclosure, the computer-readable storage medium can be any tangible medium containing or storing a program, wherein the program can be used by or in combination with an instruction execution system, apparatus or component. However, in the present disclosure, the computer-readable signal medium can include a data signal propagated in a baseband or as a part of a carrier wave, in which the computer-readable program codes are carried. This propagated data signal can take many forms, including but not limited to an electromagnetic signal, an optical signal or any suitable combination of the above. The computer-readable signal medium can also be any computer-readable medium other than a computer-readable storage medium, wherein the computer-readable medium can send, propagate, or transmit a program configured to be used by or in combination with an instruction execution system, apparatus or component. The program codes contained on the computer-readable medium can be transmitted by any suitable medium, including but not limited to wireless, a wire, an optical cable, RF, etc., or any suitable combination of the above.

Computer program codes configured to perform the operations of the present disclosure may be written in one or more programming languages or combinations thereof, wherein the programming languages include object-oriented programming languages such as Java, Smalltalk, C++, and also include conventional procedural programming languages such as "C" language or similar programming languages. The program codes can be executed completely on a user computer, partially on the user computer, as a separate software package, partially on the user computer and partially on the remote computer, or completely on the remote computer or the server. In the case of a remote computer, the remote computer can be connected to the user computer through any kind of network, including an LAN (Local Area Network) or a WAN (Wide Area Network), or can be connected to an external computer (for example, through the Internet using an Internet service provider).

The flowcharts and block diagrams in the accompanying drawings illustrate the possible realized architectures, functions and operations of the system, method and computer program product according to various embodiments of the present disclosure. In this regard, each block in the flowchart or block diagram can represent a module, a program segment, or a part of codes that contains one or more executable instructions configured to implement a specified logical function. There are specific sequential relationships in the above specific embodiments, but these sequential relationships are only exemplary. These steps, when specifically implemented, may be fewer or more, or may be adjusted in the order of execution. That is, in some alternative implementations, the functions marked in the blocks can also occur in an order different from the order marked in the accompanying drawings. For example, two blocks represented successively can actually be executed basically in parallel, and they can also sometimes be executed in the opposite order, which depends on the function involved. It should also be noted that each block in the block diagram and/or flowchart and the combination of blocks in the block diagram and/or flowchart can be realized by a dedicated hardware based system performing specified functions or operations, or can be realized by a combination of dedicated hardware and computer instructions.

The units described in the embodiments of the present disclosure can be implemented in software, or can also be implemented in hardware.

As another aspect, the present disclosure also provides a computer-readable medium storing a computer program, wherein the computer program, when executed by a processor, implements the method described in the above any embodiment.

As another aspect, the present disclosure also provides a computer-readable medium, which can be included in the apparatus described in the above embodiment, or can also exist alone without being assembled into the apparatus. The above computer-readable medium carries one or more programs. The one or more programs, when executed by the apparatus, cause the apparatus to: acquire first feature data and a source identification of data to be processed; determine a first unshared hidden unit, corresponding to the source identification, in an autoencoder, wherein the autoencoder includes a plurality of first unshared hidden units that do not share a parameter with each other; input the first feature data into the determined first unshared hidden unit, to perform noise cancellation, and output second feature data meeting a set standard; input the second feature data into a first shared hidden unit of the autoencoder, to map the second feature data to a set feature space through the first shared hidden unit, and output mapping data; and input the mapping data into a shared feature layer of the autoencoder, and output common feature data, in the first feature data, extracted by the shared feature layer.

The expressions "first", "second", "the first", or "the second" used in various embodiments of the present disclosure can embellish various parts regardless of order and/or importance, but these expressions do not limit the corresponding parts. The above expressions are only configured for the purpose of distinguishing an element from other elements. For example, the first user device and the second user device represent different user devices, although both are user devices. For example, without departing from the scope of the present disclosure, the first element can be referred to as a second element, and similarly, the second element can be referred to as a first element.

When an element (for example, a first element) is referred to as "(operatively or communicably) linked with" or "(operatively or communicatively) linked to" the other element (for example, a second element), or "connected to" the other element (for example, a second element), it should be understood that this element is directly connected to the other element or this element is indirectly connected to the other element via another element (for example, a third element). Conversely, it can be understood that when an element (for example, a first element) is referred to as "directly connected" or "directly linked" to the other element (a second element), no element (for example, a third element) is inserted between the two.

The term "module" or "functional unit" used herein can mean, for example, a unit including hardware, software, and firmware, or a unit including a combination of two or more of hardware, software, and firmware. "Module" can be used interchangeably with, for example, the term "unit", "logic", "logic block", "part", or "circuit". "Module" or "functional unit" can be the smallest unit of an integrated part element or a part of the integrated part element. "Module" can be the smallest unit or a part thereof used to perform one or more functions. "Module" or "functional unit" can be implemented mechanically or electrically. For example, a "module" or "functional unit" according to the present disclosure can include at least one of: an ASIC chip, an FPGA, or a well-known programmable logic component or a programmable logic component to be developed in the future for performing operations.

The above descriptions are only preferable embodiments of the present disclosure and the illustration of the applied technical principles. Those skilled in the art should understand that the scope of protection involved in the present disclosure is not limited to the technical solution formed by the specific combination of the above technical features, but also should include other technical solutions formed by any combination of the above technical features or their equivalent features without departing from the above inventive concept, for example, the technical solution formed by interchanging the above features with (but not limited to) the technical features with similar functions provided by the present disclosure.

What is claimed is:

1. A data processing method, comprising:
   acquiring first feature data and a plurality of source identifications of data to be processed, wherein each of the plurality of source identifications is used to indicate a source of data to be processed corresponding to the source identification, and different data sources refer to different acquisition devices or different acquisition environments;
   determining a first unshared hidden unit, corresponding to each of the plurality of source identifications, in an autoencoder, wherein the autoencoder comprises a plurality of first unshared hidden units that do not share a parameter with each other, wherein each of the plurality of first unshared hidden units is used to process first feature data of a data source with the source identification corresponding to the first unshared hidden unit, and a parameter in each of the plurality of first unshared hidden units is a parameter independently learned;
   inputting the first feature data into the determined plurality of first unshared hidden units, to perform noise cancellation to remove noise data introduced in the first feature data due to the different data sources, and outputting second feature data meeting a set standard;
   inputting the second feature data into a first shared hidden unit of the autoencoder, to map the second feature data to a set feature space through the first shared hidden unit, and outputting mapping data; and
   inputting the mapping data into a shared feature layer of the autoencoder, and outputting common feature data in the first feature data, extracted by the shared feature layer, wherein the common feature data refers to feature data, in a same type of data to be processed, that is common to the type;
   wherein the method further comprises:
   setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples; and
   wherein the first unshared hidden unit comprises a plurality of first unshared hidden layers, and each of the first unshared hidden layers comprises a plurality of hidden nodes, and a number of the hidden nodes of a respective first unshared hidden layer of the first unshared hidden unit is set according to the number of training samples of a data source corresponding the first unshared hidden unit, and the number of the hidden nodes of a next first unshared hidden layer is less than the number of the hidden nodes of a previous first unshared hidden layer.

2. The method of claim 1, wherein the outputting the second feature data meeting the set standard, comprises:
   outputting the second feature data meeting a first set dimension, wherein the first set dimension is same as a feature dimension of a first shared hidden layer at a first layer of the first shared hidden unit.

3. The method of claim 1, wherein the inputting the second feature data into the first shared hidden unit of the autoencoder, to map the second feature data to the set feature space through the first shared hidden unit, and outputting the mapping data, comprises:
   inputting the second feature data into the first shared hidden unit, which is shared by outputs of the plurality of first unshared hidden units; and
   mapping the second feature data to the set feature space through weight matrixes and offset vectors of respective first shared hidden layers of the first shared hidden unit, and outputting the mapping data.

4. The method of claim 3, wherein the inputting the mapping data into the shared feature layer of the autoencoder, and outputting the common feature data in the first feature data, extracted by the shared feature layer, comprises:
inputting the mapping data into the shared feature layer of the autoencoder, and calculating the common feature data in the first feature data by the shared feature layer according to the mapping data, and a weight matrix and an offset vector of the shared feature layer.

5. The method of claim 1, wherein the autoencoder comprises an encoder, the shared feature layer and a decoder, the encoder comprises the first shared hidden unit and the plurality of first unshared hidden units, the decoder comprises a second shared hidden unit and a plurality of second unshared hidden units, the second shared hidden unit and the first shared hidden unit are symmetrical about the shared feature layer, and each of the second unshared hidden units and a corresponding first unshared hidden unit are symmetrical about the shared feature layer; and
before acquiring the first feature data and the source identification of the data to be processed, the method further comprises:
training the autoencoder by using training samples acquired from a plurality of data sources.

6. The method of claim 5, wherein the training the autoencoder by using the training samples acquired from the plurality of data sources, comprises:
acquiring the first feature data and corresponding source identifications of the training samples, and inputting the first feature data into first unshared hidden units, corresponding to the source identifications, in the encoder;
processing the first feature data by the first unshared hidden units and the first shared hidden unit of the encoder and the shared feature layer according to the source identifications, to obtain the common feature data corresponding to the first feature data;
inputting the common feature data into the decoder and acquiring reconstructed data output by the decoder; and
iteratively training the parameter in the encoder according to the reconstructed data, until a training termination condition is met.

7. The method of claim 6, wherein the iteratively training the parameter in the encoder according to the reconstructed data, until the training termination condition is met, comprises:
calculating a loss value according to a preset loss function, the first feature data of the training samples and the reconstruction data, and adjusting parameters of the first unshared hidden units corresponding to the source identifications and a parameter of the first shared hidden unit according to the loss value; and
re-performing the acquiring the first feature data and the corresponding source identifications of the training samples, until the training termination condition is met.

8. The method of claim 7, wherein the preset loss function is:

$$\text{loss} = \sum_{s=1}^{S}\sum_{n=1}^{N_s}(v_{sn} - v'_{sn})^2 + \lambda \sum_{s=1}^{S}\sum_{m=1}^{M}\|W_{sm}\|^2 + \lambda \sum_{k=1}^{K}\|W_k\|^2 + \lambda\|W\|^2,$$

wherein, loss is a loss value; s refers to an s-th data source, a value of s ranges from 1 to S, and S refers to a total number of data sources; n refers to a n-th training sample of the s-th data source, a value of n ranges from 1 to $N_s$, and $N_s$ is a total number of training samples of the s-th data source; $v_{sn}$ is the first feature data; $V_{sn}'$ is the reconstructed data; $W_{sm}$ is a weight matrix of an m-th first unshared hidden layer of a first unshared hidden unit, corresponding to the s-th data source, in the encoder, a value of m ranges from 1 to M, and M refers to a total layer number of first unshared hidden layers contained in the first unshared hidden unit corresponding to the s-th data source; $W_k$ is a weight matrix of a k-th first shared hidden layer of the first shared hidden unit in the encoder, a value of k ranges from 1 to K, and K refers to a total layer number of first shared hidden layers contained in the first shared hidden unit; W is a weight matrix of the shared feature layer; $\lambda$ is a weight attenuation item, whose value is between 0 and 1; $\|W_{sm}\|$ refers to solving L2 norm of $W_{sm}$, $\|W_k\|$ refers to solving L2 norm of $W_k$, and $\|W\|$ refers to solving L2 norm of W.

9. The method of claim 5, wherein training the autoencoder by using the training samples acquired from the plurality of data sources, comprises:
recording an acquired n-th data from an s-th data source as first feature data $v_{sn}$ of a training sample A; wherein a value of s ranges from 1 to S, and S refers to a total number of data sources; n refers to a n-th training sample of the s-th data source, a value of n ranges from 1 to $N_s$, and $N_s$ is a total number of training samples of the s-th data source;
inputting the first feature data $v_{sn}$ of the training sample A into a first unshared hidden unit Bs; wherein a process of the first unshared hidden unit Bs processing the first feature data $v_{sn}$ is expressed as:
when m=1, processing of input data by the first unshared hidden layer is expressed as: $z_{s1n}=W_{s1}V_{sn}+b_{s1}$ and $h_{s1n}=f(z_{s1n})$; wherein, $W_{s1} \in \mathbb{R}^{D_{s1} \times F}$ is a weight matrix of a first first unshared hidden layer of the first unshared hidden unit Bs, and its dimension is $D_{s1} \times F$; $b_{s1} \in \mathbb{R}^{D_{s1}}$ is an offset vector of the first first unshared hidden layer of the first unshared hidden unit Bs, and its dimension is $D_{s1}$; $Z_{s1n}$ indicates a result calculated according to the weight matrix and offset vector of this layer; $f(\bullet)$ is a linear function and is used to perform dimensionality reduction processing; $h_{s1n}$ is a hidden vector representation of the first first unshared hidden layer corresponding to a n-th piece of data of the s-th data source, and its dimension is $D_{s1} \times 1$;
when 1<m<M, the processing of the input data by the first unshared hidden layer is expressed as: $z_{smn}=W_{sm}h_{s(m-1)n}+b_{sm}$ and $h_{smn}=f(z_{smn})$; wherein, $W_{sm} \in \mathbb{R}^{D_{sm} \times D_{s(m-1)}}$ is a weight matrix of an m-th first unshared hidden layer corresponding to the s-th data source, and its dimension is $D_{sm} \times D_{s(n-1)}$; a value of m ranges from 1 to M, and M refers to a total layer number of first unshared hidden layers contained in the first unshared hidden unit corresponding to the s-th data source; $b_{sm} \in \mathbb{R}^{D_{sm}}$ is an offset vector of the m-th first unshared hidden layer of the s-th data source, and its dimension is $D_{sm}$; $Z_{smn}$ indicates a result calculated according to the weight matrix and offset vector of this layer; $h_{smn}$ is a hidden vector representation of an m-th first unshared hidden layer corresponding to the n-th piece of data of the s-th data source, and its dimension is $D_{sm} \times 1$;

when m=M, the processing of the input data by the first unshared hidden layer is expressed as: $z_{sMn}=W_{sM} h_{s(M-1)n}+b_{sM}$ and $h_{sMn}=f(Z_{sMn})$ wherein, $W_{sM} \in \mathbb{R}^{H \times D_{s(M-1)}}$ is a weight matrix of an M-th first unshared hidden layer corresponding to the s-th data source, and its dimension is $H \times D_{s(M-1)}$; $b_{sM} \in \mathbb{R}^H$ is an offset vector of the M-th first unshared hidden layer corresponding to the s-th data source, and its dimension is H; $Z_{sMn}$ indicates a result calculated according to the weight matrix and offset vector of this layer; $h_{sMn}$ is a hidden vector representation of the M-th first unshared hidden layer corresponding to the n-th piece of data of the s-th data source, and its dimension is $H \times 1$;

inputting the second feature data $h_{sMn}$ output by the first unshared hidden unit into the first shared hidden unit; wherein a process of processing input data by a k-th first shared hidden layer of the first shared hidden unit is:

when k=1, the processing of the input data by the first shared hidden layer is expressed as: $y_{s1n}=W_1 h_{sMn}+b_1$ and $g_{s1n}=f(y_{s1n})$; wherein, a value of k ranges from 1 to K, and K refers to a total layer number of first shared hidden layers contained in the first shared hidden unit; $W_1 \in \mathbb{R}^{H \times H}$ is a weight matrix of a first first shared hidden layer, and its dimension is $H \times H$; $b_{s1} \in \mathbb{R}^H$ is an offset vector of the first first shared hidden layer, and its dimension is H; $y_{s1n}$ indicates a result calculated according to the weight matrix and offset vector of this layer; $f(y_{s1n})$ is a linear function, and is used to perform the dimensionality reduction processing; $g_{s1n}$ is a hidden vector representation of the first first shared hidden layer corresponding to the n-th piece of data of the s-th data source, and its dimension is $H \times 1$;

when k>1, the processing of the input data by the first shared hidden layer is expressed as: $y_{skn}=W_k g_{skn}+b_k$ and $g_{skn}=f(y_{skn})$; wherein, $W_k \in \mathbb{R}^{H \times H}$ is the weight matrix of the k-th first shared hidden layer, and its dimension is $H \times H$; $b_k \in \mathbb{R}^H$ is the offset vector of the k-th first shared hidden layer, and its dimension is H; $y_{skn}$ indicates a result calculated according to the weight matrix and offset vector of this layer; $g_{sKn}$ is a hidden vector representation of the k-th first shared hidden layer corresponding to the n-th piece of data of the s-th data source, and its dimension is $H \times 1$; inputting mapping data $g_{sKn}$ output by the first shared hidden unit into the shared feature later;

wherein, $g_{sKn}$ is input into the shared feature layer, and processing of input data by the shared feature layer is expressed as: $y_{sn}=Wg_{sKn}+b$ and $g_{sn}=f(y_{sn})$ wherein, $W \in \mathbb{R}^{H \times H}$ is a weight matrix of the shared feature layer, and its dimension is $H \times H$; $b \in \mathbb{R}^H$ is an offset vector of the shared feature layer, and its dimension is H; $y_{sn}$ indicates a result calculated according to the weight matrix and offset vector of this layer; $g_{sn}$ is a hidden vector representation of common feature data of the n-th piece of data of the s-th data source, and its dimension is $H \times 1$;

inputting the common feature data $g_{sn}$ into the decoder, and acquiring the reconstructed data $V_{sn}'$ output by the decoder;

calculating a loss value loss according to a loss function, the reconstructed data $V_{sn}'$ and the first feature data $v_{sn}$ wherein the loss function is as follows:

$$loss = \sum_{s=1}^{S}\sum_{n=1}^{N_s}(v_{sn}-v'_{sn})^2 + \lambda\sum_{s=1}^{S}\sum_{m=1}^{M}\|W_{sm}\|^2 + \lambda\sum_{k=1}^{K}\|W_k\|^2 + \lambda\|W\|^2;$$

wherein λ is a weight attenuation item, whose value is between 0 and 1; $\|W_{sm}\|$ refers to solving L2 norm of $W_{sm}$, $\|W_k\|$ refers to solving L2 norm of $W_k$, and $\|\|$ Refers to Solving L2 Norm of W;

adjusting parameters $W_{sm}$, $W_k$, W, $b_{sm}$, $b_k$, and b, according to the calculated loss value loss; and returning to and continuing to execute the step of recording the acquired n-th data from the s-th data source as the first feature data of the training sample A, until a termination condition is met.

10. An electronic device, comprising:
one or more processors; and
a computer-readable medium, configured for storing one or more programs,
wherein the one or more programs, when executed by the one or more processors, cause the one or more processors to implement operations of:
acquiring first feature data and a plurality of source identifications of data to be processed, wherein each of the plurality of source identifications is used to indicate a source of data to be processed corresponding to the source identification, and different data sources refer to different acquisition devices or different acquisition environments;
determining a first unshared hidden unit, corresponding to each of the plurality of source identifications, in an autoencoder, wherein the autoencoder comprises a plurality of first unshared hidden units that do not share a parameter with each other, wherein each of the plurality of first unshared hidden units is used to process first feature data of a data source with the source identification corresponding to the first unshared hidden unit, and a parameter in each of the plurality of first unshared hidden units is a parameter independently learned;
inputting the first feature data into the determined plurality of first unshared hidden units, to perform noise cancellation to remove noise data introduced in the first feature data due to the different data sources, and outputting second feature data meeting a set standard;
inputting the second feature data into a first shared hidden unit of the autoencoder, to map the second feature data to a set feature space through the first shared hidden unit, and outputting mapping data; and
inputting the mapping data into a shared feature layer of the autoencoder, and outputting common feature data in the first feature data, extracted by the shared feature layer, wherein the common feature data refers to feature data, in a same type of data to be processed, that is common to the type;
wherein the one or more programs, when executed by the one or more processors, cause the one or more processors to further implement operations of:
setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples; and wherein the first unshared hidden unit comprises a plurality of first unshared hidden layers, and each of the first unshared hidden layers comprises a plurality of hidden nodes, and a number of the hidden nodes of a respective first unshared hidden layer of the first unshared hidden unit is set according to the number of training samples of a data source corresponding the first unshared hidden unit, and the number of the hidden nodes of a next first unshared hidden layer is less than the number of the hidden nodes of a previous first unshared hidden layer.

11. The electronic device of claim 10, wherein the inputting the second feature data into the first shared hidden unit of the autoencoder, to map the second feature data to the set feature space through the first shared hidden unit, and outputting the mapping data, comprises:

inputting the second feature data into the first shared hidden unit, which is shared by outputs of the plurality of first unshared hidden units; and mapping the second feature data to the set feature space through weight matrixes and offset vectors of respective first shared hidden layers of the first shared hidden unit, and outputting the mapping data.

12. The electronic device of claim 11, wherein the inputting the mapping data into the shared feature layer of the autoencoder, and outputting the common feature data in the first feature data, extracted by the shared feature layer, comprises:

inputting the mapping data into the shared feature layer of the autoencoder, and calculating the common feature data in the first feature data by the shared feature layer according to the mapping data, and a weight matrix and an offset vector of the shared feature layer.

13. The electronic device of claim 10, wherein the autoencoder comprises an encoder, the shared feature layer and a decoder, the encoder comprises the first shared hidden unit and the plurality of first unshared hidden units, the decoder comprises a second shared hidden unit and a plurality of second unshared hidden units, the second shared hidden unit and the first shared hidden unit are symmetrical about the shared feature layer, and each of the second unshared hidden units and a corresponding first unshared hidden unit are symmetrical about the shared feature layer; and before acquiring the first feature data and the source identification of the data to be processed, the one or more programs, when executed by the one or more processors, cause the one or more processors to further implement an operation of:

training the autoencoder by using training samples acquired from a plurality of data sources.

14. The electronic device of claim 13, wherein the training the autoencoder by using the training samples acquired from the plurality of data sources, comprises:

acquiring the first feature data and corresponding source identifications of the training samples, and inputting the first feature data into first unshared hidden units, corresponding to the source identifications, in the encoder;

processing the first feature data by the first unshared hidden units and the first shared hidden unit of the encoder and the shared feature layer according to the source identifications, to obtain the common feature data corresponding to the first feature data;

inputting the common feature data into the decoder and acquiring reconstructed data output by the decoder; and iteratively training the parameter in the encoder according to the reconstructed data, until a training termination condition is met.

15. The electronic device of claim 14, wherein the iteratively training the parameter in the encoder according to the reconstructed data, until the training termination condition is met, comprises:

calculating a loss value according to a preset loss function, the first feature data of the training samples and the reconstruction data, and adjusting parameters of the first unshared hidden units corresponding to the source identifications and a parameter of the first shared hidden unit according to the loss value; and re-performing the acquiring the first feature data and the corresponding source identifications of the training samples, until the training termination condition is met.

16. A non-transitory computer-readable medium storing a computer program, wherein the computer program, when executed by a processor, implements operations of:

acquiring first feature data and a plurality of source identifications of data to be processed, wherein each of the plurality of source identifications is used to indicate a source of data to be processed corresponding to the source identification, and different data sources refer to different acquisition devices or different acquisition environments;

determining a first unshared hidden unit, corresponding to each of the plurality of source identifications, in an autoencoder, wherein the autoencoder comprises a plurality of first unshared hidden units that do not share a parameter with each other, wherein each of the plurality of first unshared hidden units is used to process first feature data of a data source with the source identification corresponding to the first unshared hidden unit, and a parameter in each of the plurality of first unshared hidden units is a parameter independently learned;

inputting the first feature data into the determined plurality of first unshared hidden units, to perform noise cancellation to remove noise data introduced in the first feature data due to the different data sources, and outputting second feature data meeting a set standard;

inputting the second feature data into a first shared hidden unit of the autoencoder, to map the second feature data to a set feature space through the first shared hidden unit, and outputting mapping data; and inputting the mapping data into a shared feature layer of the autoencoder, and outputting common feature data in the first feature data, extracted by the shared feature layer, wherein the common feature data refers to feature data, in a same type of data to be processed, that is common to the type;

wherein the computer program, when executed by a processor, further implements operations of:

setting a dimension of a first unshared hidden unit corresponding to each of the data sources according to a number of training samples, corresponding to each of the data sources, in all the training samples, such that for any two of the data sources, a dimension of a first unshared hidden unit corresponding to one data source corresponding to more training samples is greater than a dimension of a first unshared hidden unit corresponding to another data source corresponding to fewer training samples; and wherein the first unshared hidden unit comprises a plurality of first unshared hidden layers, and each of the first unshared hidden layers comprises a plurality of hidden nodes, and a number of the hidden nodes of a respective first unshared hidden layer of the first unshared hidden unit is set according to the number of training samples of a data source corresponding the first unshared hidden unit, and the number of the hidden nodes of a next first unshared hidden layer is less than the number of the hidden nodes of a previous first unshared hidden layer.

17. The non-transitory computer-readable medium of claim 16, wherein the outputting the second feature data meeting the set standard, comprises:

outputting the second feature data meeting a first set dimension, wherein the first set dimension is same as a feature dimension of a first shared hidden layer at a first layer of the first shared hidden unit.

18. The non-transitory computer-readable medium of claim 16, wherein the inputting the second feature data into the first shared hidden unit of the autoencoder, to map the second feature data to the set feature space through the first shared hidden unit, and outputting the mapping data, comprises: inputting the second feature data into the first shared hidden unit, which is shared by outputs of the plurality of first unshared hidden units; and mapping the second feature data to the set feature space through weight matrixes and offset vectors of respective first shared hidden layers of the first shared hidden unit, and outputting the mapping data.

19. The non-transitory computer-readable medium of claim 18, wherein the inputting the mapping data into the shared feature layer of the autoencoder, and outputting the common feature data in the first feature data, extracted by the shared feature layer, comprises: inputting the mapping data into the shared feature layer of the autoencoder, and calculating the common feature data in the first feature data by the shared feature layer according to the mapping data, and a weight matrix and an offset vector of the shared feature layer.

* * * * *